US012808463B2

(12) United States Patent
Ospina Medina et al.

(10) Patent No.: US 12,808,463 B2
(45) Date of Patent: Nov. 24, 2026

(54) SEALING ASSEMBLY AND METHOD FOR THE HERMETIC ISOLATION OF TWO AREAS WITH DIFFERENT ATMOSPHERES

(71) Applicant: SOLIMEK S.A.S., Antioquia (CO)

(72) Inventors: Juan David Ospina Medina, Antioquia (CO); Alejandro Urrego Lopera, Antioquia (CO); Juan Sebastian Toro Plata, Antioquia (CO)

(73) Assignee: SOLIMEK S.A.S., Antioquia (CO)

( * ) Notice: Subject to any disclaimer, the term of this patent is extended or adjusted under 35 U.S.C. 154(b) by 727 days.

(21) Appl. No.: 18/246,177

(22) PCT Filed: Sep. 23, 2020

(86) PCT No.: PCT/CO2020/000014

§ 371 (c)(1),
(2) Date: Mar. 21, 2023

(87) PCT Pub. No.: WO2022/063346

PCT Pub. Date: Mar. 31, 2022

(65) Prior Publication Data

US 2023/0366488 A1 Nov. 16, 2023

(51) Int. Cl.
*F16L 5/02* (2006.01)
*F16L 5/08* (2006.01)

(52) U.S. Cl.
CPC .................................... *F16L 5/08* (2013.01)

(58) Field of Classification Search
CPC ....... F16L 5/08; F16L 5/02; F16L 5/00; F16L 19/07; B25B 27/28; B25B 27/06; B25B 27/062; B25B 29/00; B25B 27/023
USPC .......................................................... 138/89
See application file for complete search history.

(56) References Cited

U.S. PATENT DOCUMENTS

| | | | |
|---|---|---|---|
| 4,267,401 A | 5/1981 | Wilkinson | |
| 4,728,296 A * | 3/1988 | Stamm | H01R 13/533 439/465 |
| 5,433,487 A * | 7/1995 | Kuhn | F16L 5/08 285/356 |
| 10,431,923 B2 * | 10/2019 | Tovar Murcia | H01R 13/523 |

FOREIGN PATENT DOCUMENTS

| | | |
|---|---|---|
| CO | 2018009813 U1 | 10/2018 |

* cited by examiner

*Primary Examiner* — Kenneth Rinehart
*Assistant Examiner* — Haotian Lu
(74) *Attorney, Agent, or Firm* — Patenting Consulting Group; Roberto J Rios

(57) ABSTRACT

An isolating seal assembly and method for hermetically isolating two areas with different atmospheres, wherein the isolation is total or partial in order to allow for the passage of circular elements, such as energy cables, data or pipes that carry fluids, or to simply isolate the areas without any element passing through the device. Said assembly comprises: A plug seal, a sliding jacket, a receiver bushing, a closing cap, a pusher, an upper retainer, a lower retainer, and sealing rings, such as O-rings.

23 Claims, 8 Drawing Sheets

SEALING ASSEMBLY AND METHOD FOR THE HERMETIC ISOLATION OF TWO AREAS WITH DIFFERENT ATMOSPHERES

TECHNOLOGY SECTOR AND TECHNICAL BACKGROUND

Under certain technical operations, in the presence of two different atmospheres, it becomes necessary that long elements such as tubes or cables pass from one atmosphere to the other atmosphere. In other special circumstances, it is necessary to fix or prevent leaks between said atmospheres, and, in this sense, it becomes necessary to have a means for sealing holes.

The simplest solution consists in using a plug made of a resilient material, such as rubber, with the required through-holes for the passage of long objects through them. However, some inconveniences arise such as low external resistance to certain atmospheres, undesired longitudinal movements, cable or tube tightening limited by geometric factors, etc.

It is desirable to have a seal that achieves an effective sealing while also allowing for the passage of tubes or cables maintaining the operability even under extreme working conditions.

Alternatively, on the basis of the same technique, it is desirable to have a total sealing system; that is to say, a plugging sealing for an absolute tightness when it is not contemplated that cables or tubes pass therethrough.

In view that the required sealing unit faces several simultaneous problems to be solved, it is expected that the solution is provided by an assembly; that is to say, multiple elements integrated with each other so that each of them makes an individual contribution to the whole set, which is the solution itself.

One of the objects intended by this invention is to provide a sealing unit consisting of an optimum number of elements.

Another object of this invention is to have a seal assembly that includes a tool for assisting in building the assembly in an intrinsic way thus avoiding the use of external tools.

Additionally, it is desirable to have a sealing element wherein the applied forces are well distributed in order to ensure an efficient sealing.

The state of the art teaches various seal assemblies, among which the following ones are to be cited since that they are deemed as the closest assemblies in the state of the art.

The Utility Model CO NC2018/0009813 (Toro) document discloses a sliding compression jacket for the hermetic isolation of electrical cables and other conductive lines that makes it possible to isolate one or two pressurized atmospheres that cannot be mixed and through which cables or flow lines carrying electricity, data or fluids must pass; consequently, said cables or lines cannot be damaged in any part thereof.

This solution comprises a 3-piece system; the plug is compressed by the jacket in a static state when the plug has been positioned on the ring to avoid its movement. This document does not describe the method by which the compression is performed and it further leaves open the possibility of including a descriptive process or other closing methods. Additionally, said document does not have the complete blocking option; that is to say the plug seal without holes. It does not describe whether the plug seal holes are fixed or variable in order to be tightened to the cable or cables to be sealed.

On the other hand, the existence of document WO2015/067222 (Tovar) is known. Said document relates to a progressive-action sealing system comprising piston-type moving components consisting of: an upper piston, an elastomer and a lower piston, within a pressure chamber, using two pre-seals, an upper pre-seal and a lower pre-seal, sealing the conductor elements by means of one or several elastomers.

Said elastomers, which are mechanically assembled by joining the upper connector with the pressure chamber, thus forming a bi-directional pressure sealing barrier that progressively acts in response to the existing pressure force and in the direction to which the pressure is directed; if the pressure is directed from the lower section to the upper section, the lower piston moves progressively and proportionally to the pressure force towards the upper piston, wherein the piston receives the pressure force but does not directly receive the elastomer, in such a way that the elastomer is compressed and applies a greater sealing force against the conductor; if the pressure is from the upper section to the lower section, the opposite effect shall be caused; that is to say, the upper piston moves progressively and proportionally to the pressure force towards the lower piston thus creating a sealing force that is bi-direction and proportional to the pressure force.

Finally, document U.S. Pat. No. 4,267,401 (Wilkinson) describes a sealing plug for conduits that has a plug core including at least one radially-expansible sealing member for sealing the conduit in which it is located while allowing for the passage of cables or the like therethough. Until required for the cable or cables, the passages in the sealing plug are closed by removable pin inserts, and retainer means are provided to hold the inserts in place.

The plug includes longitudinal compression means to put the sealing member into sealing contact with the conduit wall. Each passage may open towards the respective sealing member circumference through slots to allow for the side insertion of the cable therein.

The invention relates to an isolating seal assembly for hermetically isolating two areas having different atmospheres, wherein the isolation is total or partial in order to allow for the passage of circular elements such as energy cables or tubes.

This invention solves the problem of hermetically isolating two areas with different atmospheres by means of an isolating seal assembly, thus achieving the isolation of said atmospheres, in which the isolation may be total and absolute or it may allow for the passage of circular elements such as energy cables or tubes.

The isolating seal assembly comprises: a plug seal, a sliding jacket, a receiver bushing, a closing cap, a pusher, an upper retainer, a lower retainer, and sealing rings. Said isolating seal assembly is characterized in that: the plug seal is introduced into the receiver bushing after the lower retainer has been inserted, then the sliding jacket is pushed by the pusher, which is actuated by means of the closing cap, towards the plug seal compressing it towards its own center, after the total closure of the closing cap in the receiver bushing by means of the stop provided by the pusher, the pusher is removed and then the upper retainer is positioned at the location that had been occupied by the pusher after which the closing cap is placed again thus effecting the final closure in relation to the lower retainer.

The proposed solution comprises a main element named plug seal that may be solid in order to achieve an absolute and total isolation or it may have from preferably one to nine circular through-holes to allow for the passage of circular elements, such as energy cables or tubes. The number of through-holes must be the same in each assembly as the number of through-holes of the lower retainer and upper retainer.

Preferably, the plug seal is made of rubber so that its volume may be compressed and compacted and has a specific geometry, which, when modified during compression, ensures an even distribution of the forces applied to all of the surfaces with which it enters into contact, thus achieving a sealing effect that hermetically isolates the two areas separated by the plug seal. By means of said sealing, it is possible to ensure its tightness at high pressures.

This invention surpasses the prior art since it includes an assembly by means of the action of a pusher, which is not an integral part of the seal assembly unit in its final state but plays an important role in the assembly since it is an element that transmits force from the closing cap to the sliding jacket in order to compress the plug seal and after performing its compression role, the space that had been occupied by the pusher is then occupied by the upper retainer, which is an integral part of the assembly in its final state. In both cases, both the pusher and the retainer are actuated by the closing cap, which serves as a closure in relation to the receiver bushing up to the stops provided in both the pusher and the upper retainer. This feature is not disclosed in the prior art.

The main role of the pusher is to eliminate the use of external tools and turn the closing cap and the receiver bushing into the tool itself. Although it is a sacrificial element owing to the fact that it is discarded after completing the assembly and then it is replaced by the upper retainer, its presence in the system during the assembling process turns it into an essential element to ensure the proper operation and optimum reliability of the device.

Additionally, the pusher facilitates the installation (assembling process) and helps minimizing intervention times; its symmetrical design makes its positioning easy for the operator and minimizes the possibility of error since it may be positioned from either side. It is a simple tool for providing effectiveness in the compression process.

As far as the upper retainer is concerned, it has the same number of holes as the number of holes of the plug seal and the lower retainer. Said holes are arranged in the same proportion and distribution, which preferably is a symmetrical distribution, such as, for example, in the case of three holes, the arrangement shall be in such a way that the center of the holes be at 120° C. from each other.

The separation radius between the center of the holes and the center of the piece itself has a variation in the upper retainer. This configuration is defined because in view that the plug seal is made of a resilient material, when it is compressed by the sliding jacket, it undergoes a radial deformation that makes the holes get close to the center of the plug seal as a consequence of which the cables to be sealed get closer.

Since the upper retainer is a solid rigid element with minimum flexibility and with the role of holding the plug seal in place, it requires a precise alignment with regard to the cables that are being sealed in order to facilitate its positioning and effective fastening.

For this reason, it is provided that the separation radius of the holes in relation to the center of each element is smaller in the upper retainer than in the plug seal and lower retainer for a proper alignment.

Once the assembly has been built, the components maintain the tightening in a static way; that is to say that they do not employ moving elements such as pistons or the like and such a feature provides the advantage that the components are not subject to wear as in the case of pistons or the like.

The above-mentioned incorporations are a significant improvement in the state of the art since there are not prior similar elements that carry out this function and provide advantages of a functional nature, an assembling process, ease of operation and tightening that finally turn into the optimum reliability on the system performance.

The figures are not scale drawings and do not have dimensional ratios among them; instead, their purpose is to support the description and understanding of the invention.

DESCRIPTION OF THE EMBODIMENT

Figure 1:
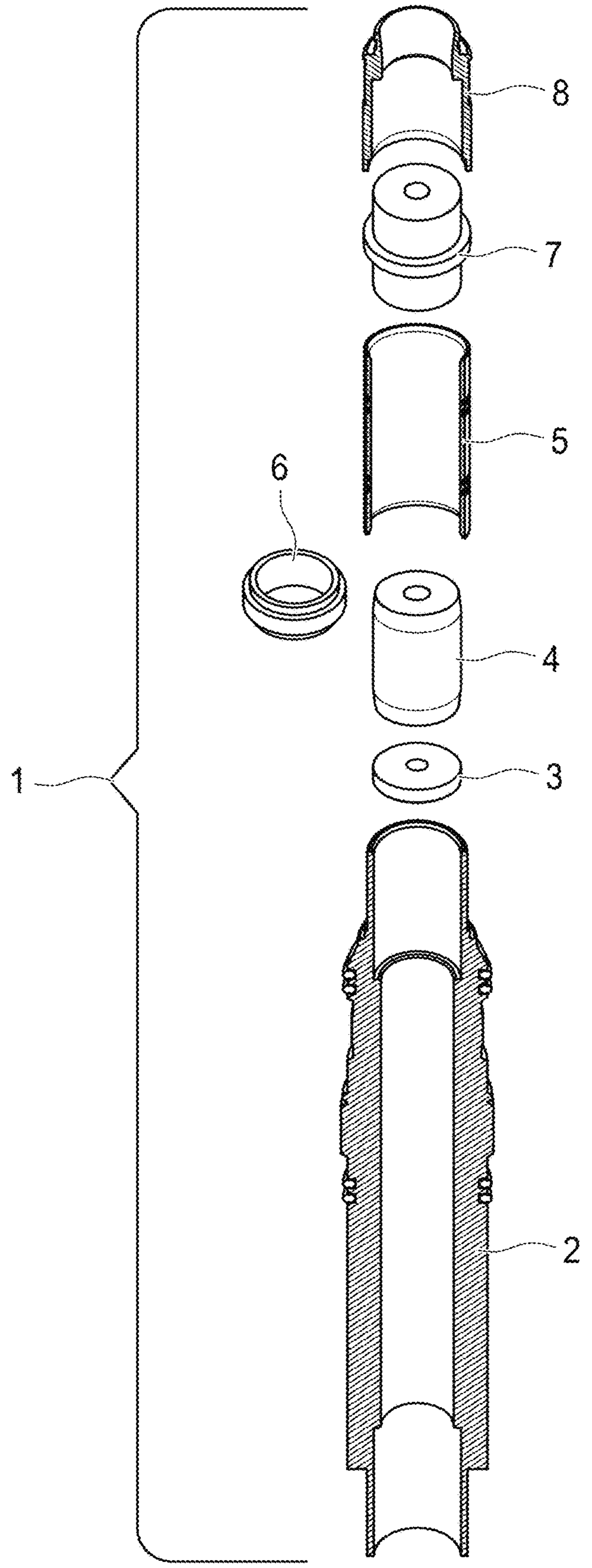
FIG. 1 is an axonometric projection and partial cutaway view in relation to certain elements thereof, which shows an exploded view of the components of the seal assembly according to this invention.

In FIG. 1, a seal assembly 1 according to the present invention is detailed, said seal assembly 1 comprising: a receiver bushing 2, a lower retainer 3, a plug seal 4, a sliding jacket 5, a pusher 6, an upper retainer 7, and a closing cap 8. Said components are the main elements of the seal assembly 1, wherein the pusher 6 has the role of sliding the sliding jacket around the plug seal, both of which are arranged within the receiver bushing in order to compress the plug seal 4 into its enclosure in the sliding jacket 5 and to be replaced then by the upper retainer 7, and the pusher 6 and the upper retainer 7 had been actuated at the time by the closing cap 8.

Each of the main elements of the seal assembly 1 with each of their functional parts may be appreciated from FIGS. 2 to 8.

Figure 2:
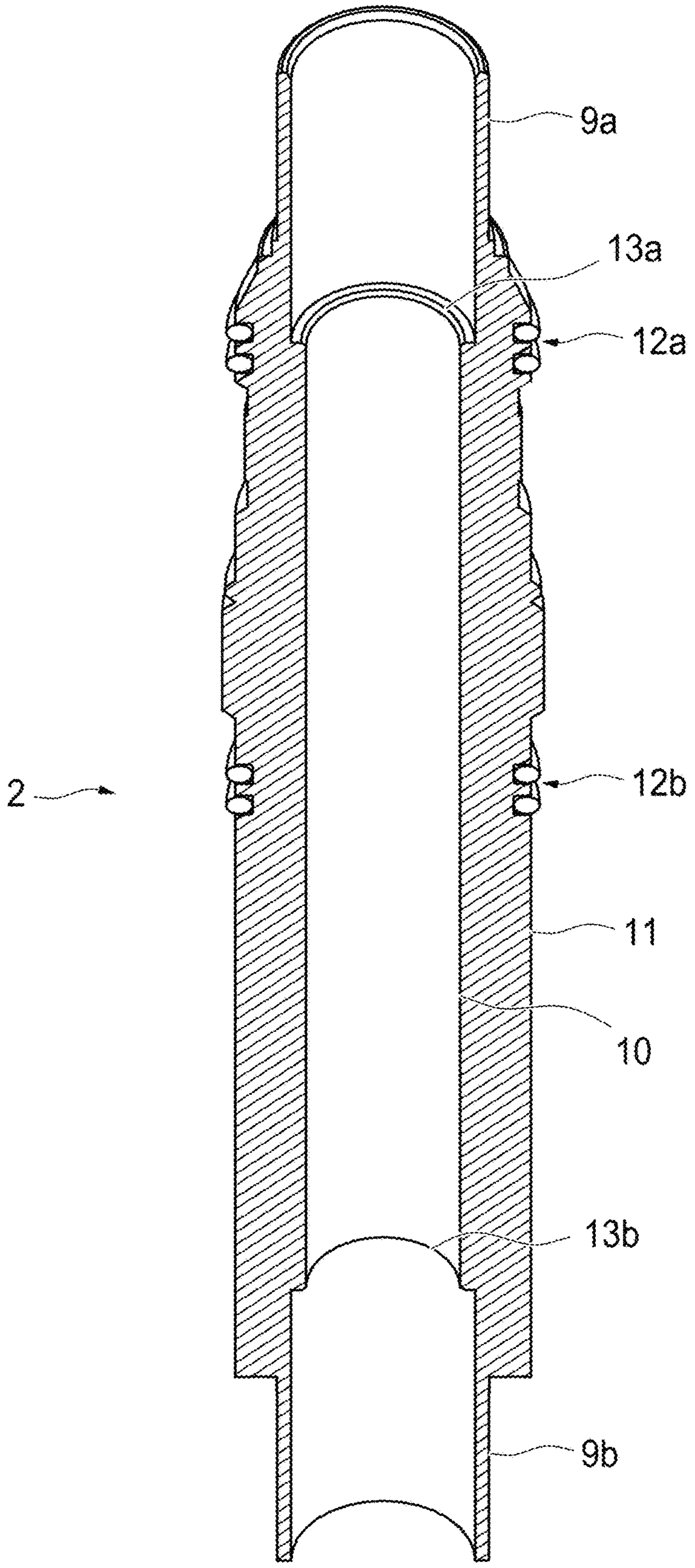
FIG. 2 shows detailed sectional view of the receiver bushing with its main functional elements according to this invention.

FIG. 2 shows a receiver bushing 2 that consists of an upper tubular section 9*a*, a lower tubular section 9*b*, a central tubular portion 10, a solid enclosing body 11 extending from the lower tubular portion 9*b*, then along the central tubular portion 10, to the upper tubular portion 9*a*, thus externally enclosing each of said portions 9*a* y 9*b*. On its outer surface, the solid enclosing body 11 is uneven and, preferably, it comprises at least one O-ring 12*a*, with the possibility of comprising at least an additional O-ring 12*b*, in order to ensure the assembly localized tightness.

Additionally, the upper tubular portion 9*a* and the lower tubular portion 9*b* have an inner diameter greater than the inner diameter of the central tubular portion 10, thus defining seats, that is to say an upper seat 13*a*, corresponding to the diameter change between the upper tubular portion 9*a* and the central tubular portion 10 of a part, and of another part, a lower seat 13*b* derived from the diameter change between the lower tubular portion 9*b* and the central tubular portion 10. These seats are essential for forming the coupling with the other components of the seal assembly I.

Furthermore, both in the upper tubular section 9*a* and the lower tubular section 9*b*, as far as their external surfaces are concerned, coupling or closing, means are provided in relation to another element that is detailed below, so as to ensure the seal assembly I closure. Preferably, although not exclusively, said closing mean is threaded for a threaded coupling with said element that is detailed below.

The receiver bushing 2, preferably but not exclusively, is made of metal material.

Figure 3:
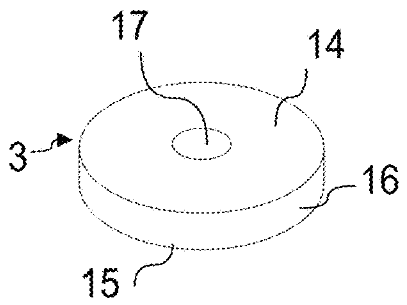
FIG. 3 shows an axonometric projection view of the lower retainer according to this invention.

FIG. 3 shows a lower retainer 3, which is a disc having thickness 16 less than its diameter, said lower retainer 3 having a flat bottom surface 15, and a flat top surface 14, and it may have at least one through-hole 17.

The lower retainer 3 is, preferably but not exclusively, made of metal material.

Figure 4:
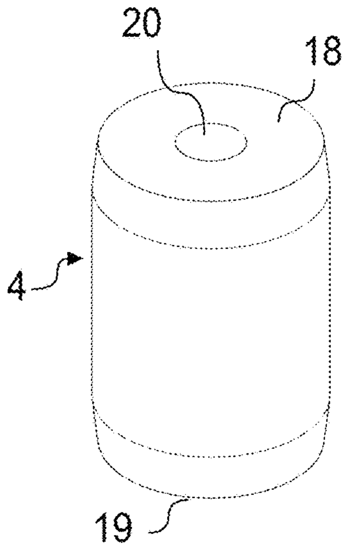
FIG. 4 is an axonometric projection view of the plug seal according this invention.

FIG. 4 shows a plug seal 4, which is a cylinder having a flat bottom surface 19 and a flat top surface 18, and it may have at least one through-hole 20.

The plug seal 4 is preferably made of resilient material and, even more preferably but not exclusively, it is made of rubber.

Figure 5:
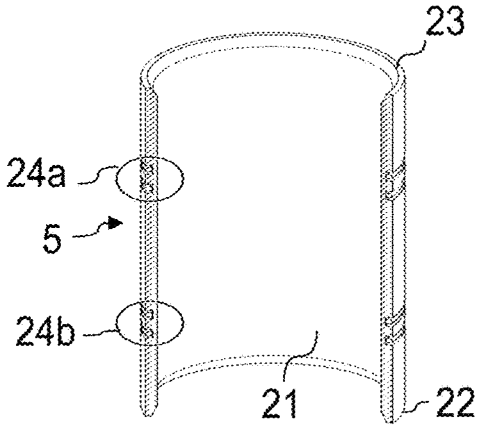
FIG. 5 is a sectional view that shows the sliding jacket with its main functional elements that form the present invention.

FIG. 5 shows a sliding jacket 5, which is a hollow cylinder consisting of an inner surface 21 and an outer surface 22, both with different diameters, wherein the outer surface 22 diameter is slightly greater than the inner surface 21 diameter thus defining between them the thickness 23 of the sliding jacket 5, and on and around the outer surface 22 there is at least one O-ring 24*a*, with the possibility of at least a second O-ring 24*b*.

The sliding jacket 5 is preferably although not exclusively made of metal material.

Figure 6:
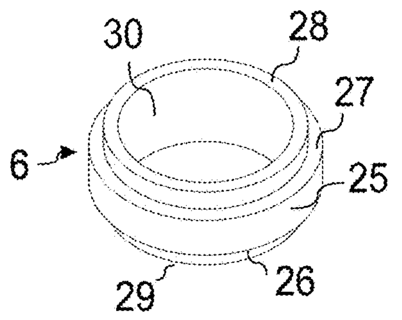
FIG. 6 is an axonometric projection view of the pusher according to the present invention.

FIG. 6 shows a pusher 6, which is an irregular hollow cylinder defined by a through-hole 30, which diameter is slightly less than the diameters of the outer surface, said diameters of the outer surface being defined by a section change from a top surface 27 to a central surface 25, which diameter is greater than said top surface 27 as well as greater than the bottom surface 26 diameter, the free edge of the top surface defines an upper seat 28 of a certain thickness and the free edge of the bottom surface defines a lower seat 29 having a certain thickness.

The pusher 6 is preferably but not exclusively made of polymer material.

Figure 7:
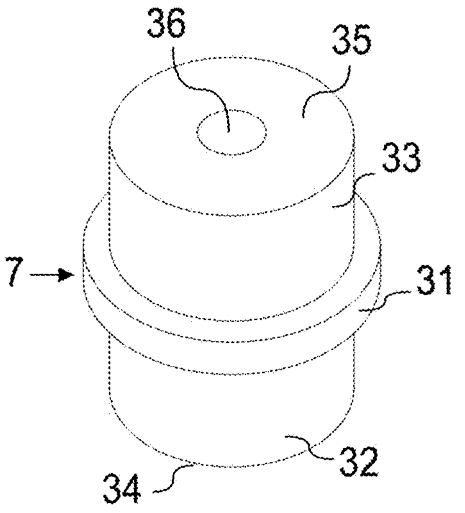
FIG. 7 is an axonometric projection view of the upper retainer comprised in the present invention.

FIG. 7 corresponds to an upper retainer 7, which is a cylinder comprising three sections on its outer surface, to wit: an upper section 33, which has a diameter less than a central surface 31, where the diameter of said central surface 31 is also greater than a lower surface 32.

Additionally, the upper retainer 7 comprises a flat top surface 35, which serves as a seat, and a flat bottom surface 34, which also serves as a seat.

The upper retainer 7 is preferably but not exclusively made of polymer material.

Figure 8:
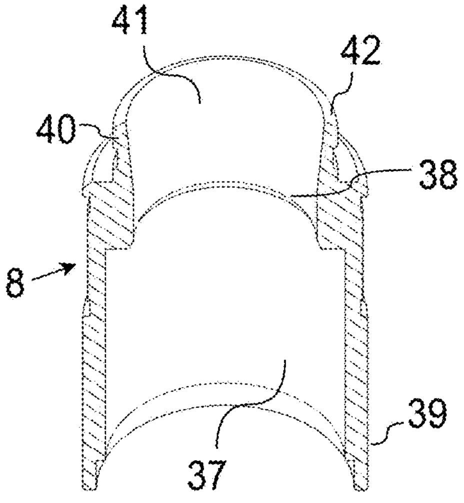
FIG. 8 is a detailed sectional view of the closing cap according to the invention.

FIG. 8 is a closing cap 8, which has an irregular hollow cylinder shape consisting of an external body 39 extending externally from its lower part to an upper section 40, wherein the diameter of said upper section 40 is lower than the external body 39 diameter.

Additionally, on its internal surface from its lower section to approximately the upper section 40 level, the closing cap 8 has an internal closing section 37 with the purpose of ensuring a closure with any of the upper section 9*a* or the lower section 9*b* of the receiver bushing 2, at the upper end of said internal closing surface there is a flat stop 38 limiting the closing travel defined by the internal closing section 37, between the flat stop 38 and the upper section 40, an internal smooth upper surface 41 is defined, and the diameter difference between said internal smooth upper surface 41 and the diameter of the upper section 40 defines an upper wall thickness 42.

The closing cap is preferably but not exclusively made of metal material.

Figure 9:
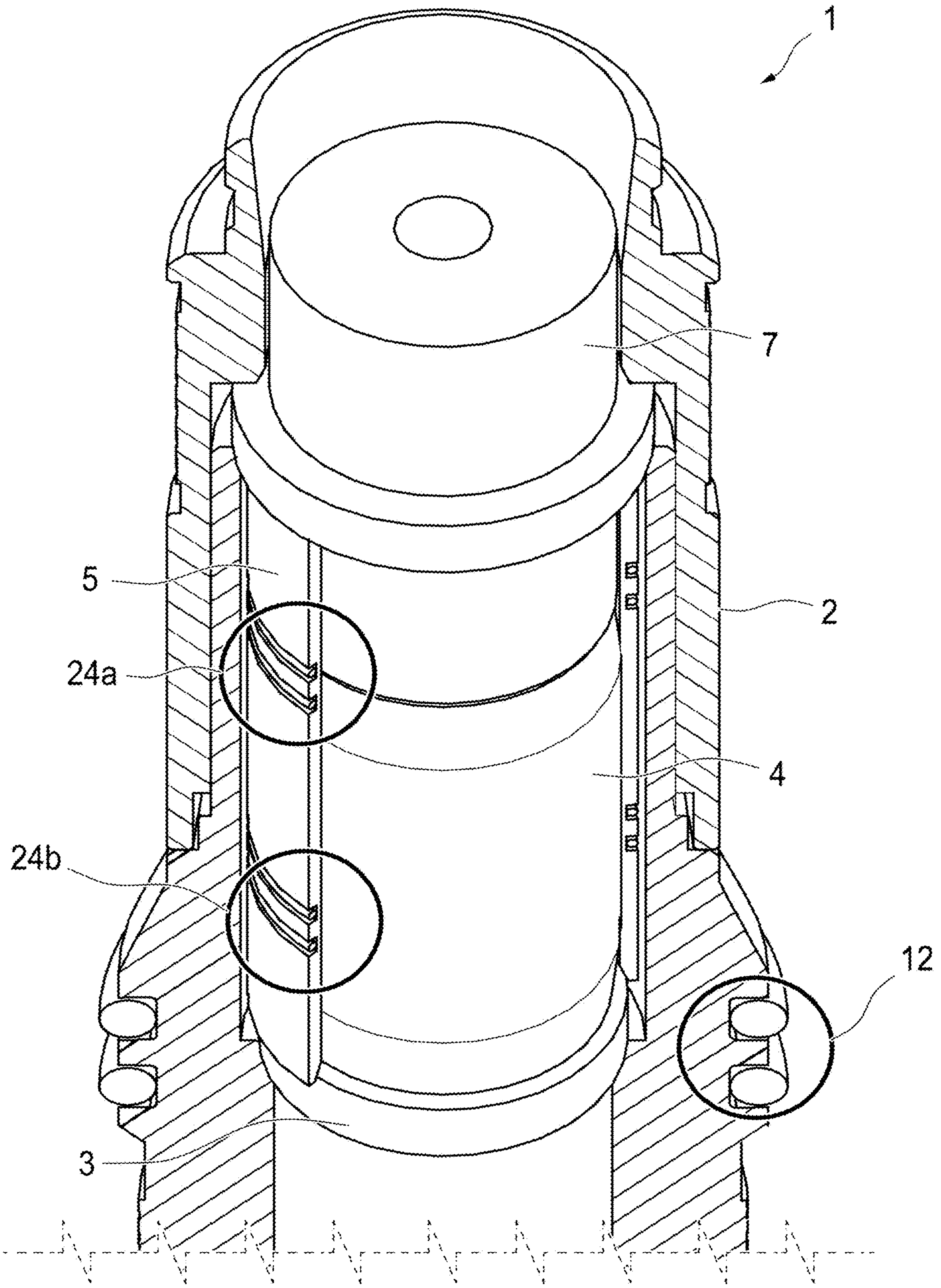
FIG. 9 is a sectional view that represents the seal assembly with its main components.

In FIG. 9, the seal assembly 1 may be seen with all of its main elements assembled and forming a unit. Said sequential assembly is understood when FIG. 9 is seen together with each of the above-described FIGS. 2 to 8 and it is achieved by firstly positioning the lower retainer 3 in such a way that any of the flat top surface 14 or the flat bottom surface 15, depending on how the surface is oriented, seats on the upper seat 13*a*, or on the lower seat 13*b*, respectively, of the receiver bushing 2, to form a flat seat coupling between both surfaces in contact.

Then, there is provided the plug seal 4, which flat lower surface 19, or flat upper surface 20, respectively, rests on the flat top surface 14 or the flat bottom surface 15 of the lower retainer 3, depending on how it is oriented. Here, there is also a flat seat between the surfaces with the particularity that the diameter of said lower retainer is greater than the plug seal diameter. The plug seal is made of a resilient material so that its diameter is reduced by compression thereon.

Then, there is provided the sliding jacket 5, which inner surface diameter is less than the initial cross-sectional section of the plug seal 4, said sliding jacket previously having on its outer surface 22 at least one O-ring 24*a*, and it may have at least one additional O-ring 24*b*; that is to say that more additional O-rings may be provided for according to the specific dimensional and functional configuration of the particular application.

Afterwards, the pusher 6 is positioned on the free portion of the sliding jacket 5, and, in turn, on the free portion of the pusher 6, the closing cap 8 is positioned, said closing cap is applied a force that is transmitted onto the pusher 6 and, in turn, to the free portion of the sliding jacket 5, thus causing the sliding jacket to slide on either the inner surface of the upper tubular section 9*a* or the inner surface o the lower tubular section 9*b*, corresponding to the receiver bushing 2 according to what is selected in the assembling process.

The closing action is performed until the pusher central surface 25, which serves as a stop, limits the relative movement of the closing cap 8 in relation to the receiver bushing 2, more specifically in relation to the upper tubular section 9*a*, or in relation to the lower tubular section 9*b*, of said receiver bushing, according to what is selected in the assembling process.

The pusher 6 is symmetrical between the top surface 27 and the bottom surface 26, which eases the task of the assembler of positioning this element in the assembly irrespective of its location direction of said pusher 6.

Upon achieving the effect of stopping the closing action between the closing cap 8 and the receiver bushing 2, the closing cap 8 is removed with a relative reverse movement with regard to the initial closing action related to the receiver bushing 2, that is to say that the pusher 6 is decoupled and removed from the set and it is replaced by the upper retainer 7 in a proceeding analogous to the proceeding carried out by means of the pusher 6 action.

The final closing movement by means of the closing cap 8 transmits force to the upper retainer 7 and causes a final closure between said closing cap and the receiver bushing, enclosing between them the sliding jacket 5 which, in turns, encloses the plug seal 4, both the sliding jacket 5 and the plug seal 4 rest on the lower retainer 3 on one of their flat surfaces, either the flat bottom surface 15 or the flat top surface 14, according to what is selected in the assembling process. In this way, the assembly unit corresponding to the seal assembly 1 according to the present invention is obtained.

The closing action between the closing cap 8 and the receiver bushing 2 is preferably carried out by threading by having complementary threads on each of them in order to be threaded and achieve the closing action in this way.

Alternatively, the closing action between the closing cap 8 and the receiver bushing 2 may be made by means of press fit between them and then by means of side security mechanisms that prevent the movement of one element in relation to the other element, one element is attached the other.

The above-described elements, the at least one hole 17 of the lower retainer, the at least one hole 20 of the plug seal and the at least one hole 36 corresponding to the upper retainer must match at the end of the assembling process, and, consequently, when the number of holes is at least a pair of holes, the radial arrangement in the holes of the plug seal is radially more distant in order to achieve said match. In any case, the number of holes beyond this particular detail is always the same between the lower retainer 3, the plug seal 4 and the upper retainer 7.

Figure 12:
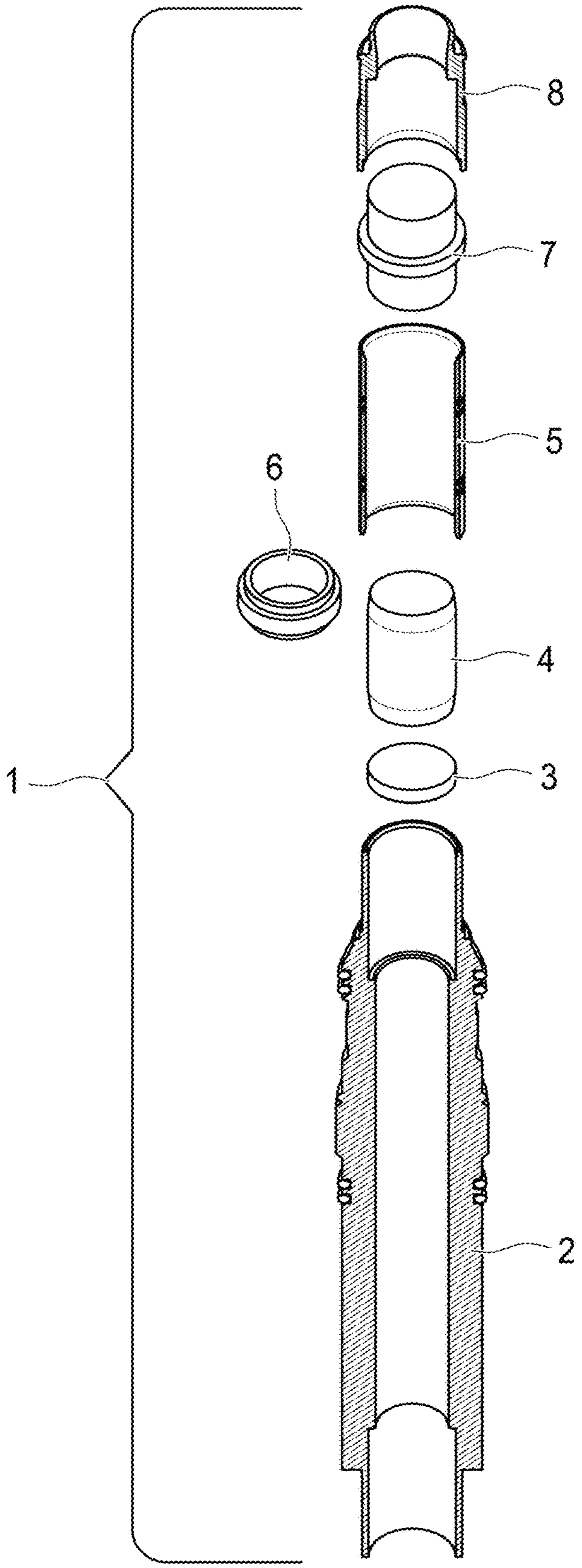
FIG. 12 is an axonometric projection and partial cutaway view in relation to certain elements thereof, which shows an exploded view of the components of the seal assembly according to an embodiment of this invention.

Now, for certain applications, it is necessary not to have holes in order to achieve an absolute and total sealing. This is the case when it is intended that no cables or tubes pass through the seal assembly 1. This option is also considered as an alternative embodiment of the present invention, as illustrated in FIG. 12.

Figure 10:
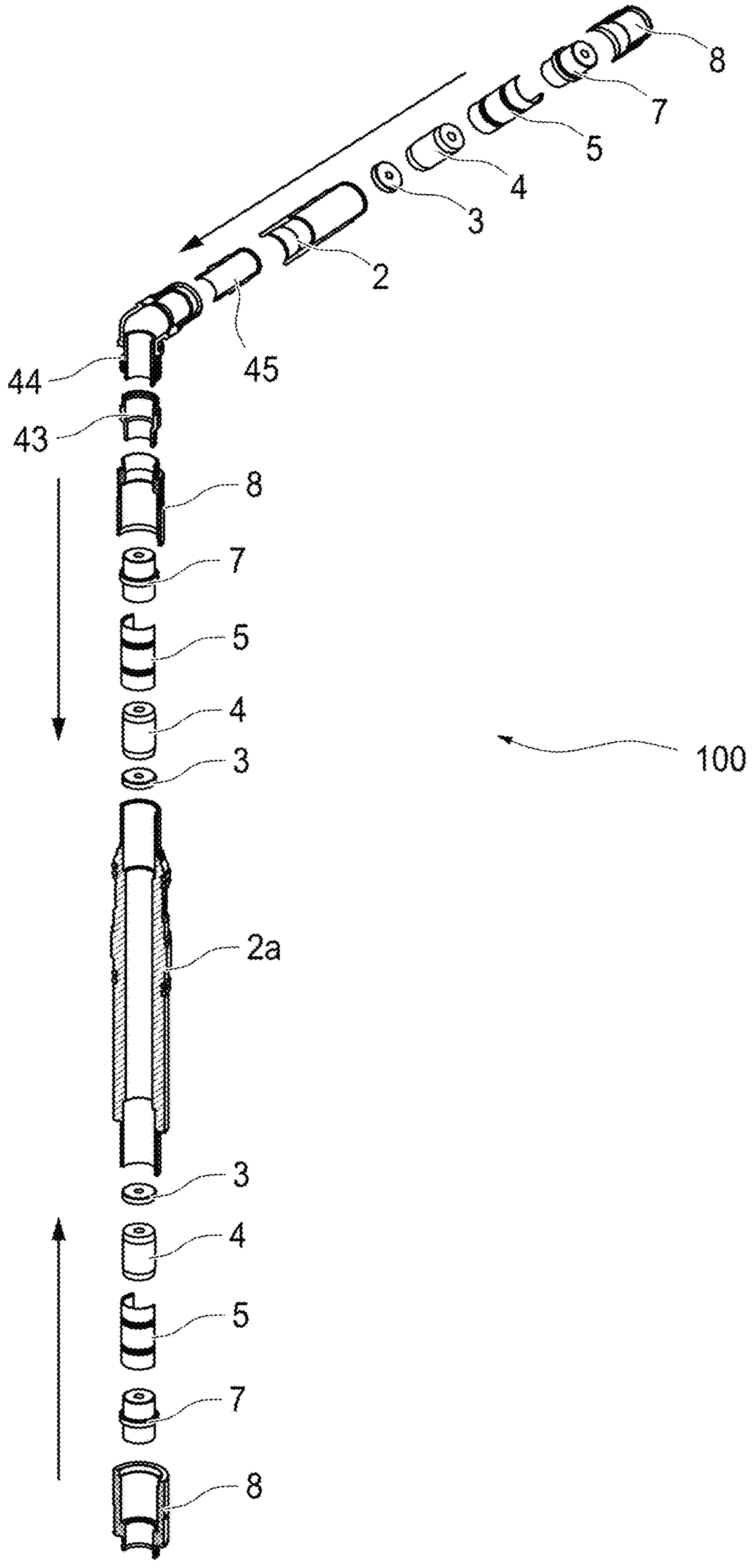
FIG. 10 is an exploded view with some details in sectional view that shows an alternative embodiment of the solution corresponding to the invention.

Furthermore, by the phrase "according to what is selected in the assembling process" that has been repeatedly stated along the above-described configuration, it is meant that one of the particularities is that the assembly may be oriented downwards or upwards according to the direction decided for the assembling process; however, it is also possible to build the assembly both downwards and upwards; that is to say, in both directions inclusive, thus permitting to employ several seal assembly units 1 in series, connected by means of a common dual receiver bushing 2*a* as shown in FIG. 10.

In a general way, a configuration of several assembly units built by means of couplings in series is shown in FIG. 10. There may be seen in said figure an assembly of multiple sealing units 100 consecutively arranged by means of arrangements based on the configuration described and shown hereinabove and supported by FIGS. 1 to 9.

In said embodiment, it may be appreciated that the dual receiver bushing 2*a* may be used to assemble the other components both downwards and upwards and then develop the arrangement continuity therefrom, as well as that said receiver bushing may have a relative length significantly greater than the above-described receiver bushing 2. In said FIG. 10, it is also seen that a receiver bushing 2, wherein the assembly of its components is developed at one of its ends and, at its opposite end, a connector coupling 45 may be provided for, which, in turn, may be coupled with a connector 44, that may be at an angle according to direction change requirements or straight, wherein said connector 44, at its free end, may be connected to a second connector coupling 43, which, in turn, at its free end, may be similarly connected to a terminal closing cap 8 of some other assembled section of said assembly of multiple sealing units 100.

This configuration of continuous sections wherein several seal assemblies 1 are replicated in series to form an assembly of multiple sealing units 100 is useful when the technical implementation so requires.

For the purpose of the assembly, what is applicable to the receiver bushing 2 is also applicable to the dual receiver bushing 2*a*.

The thick arrows denote the assembly direction of each sealing unit.

Figure 11:
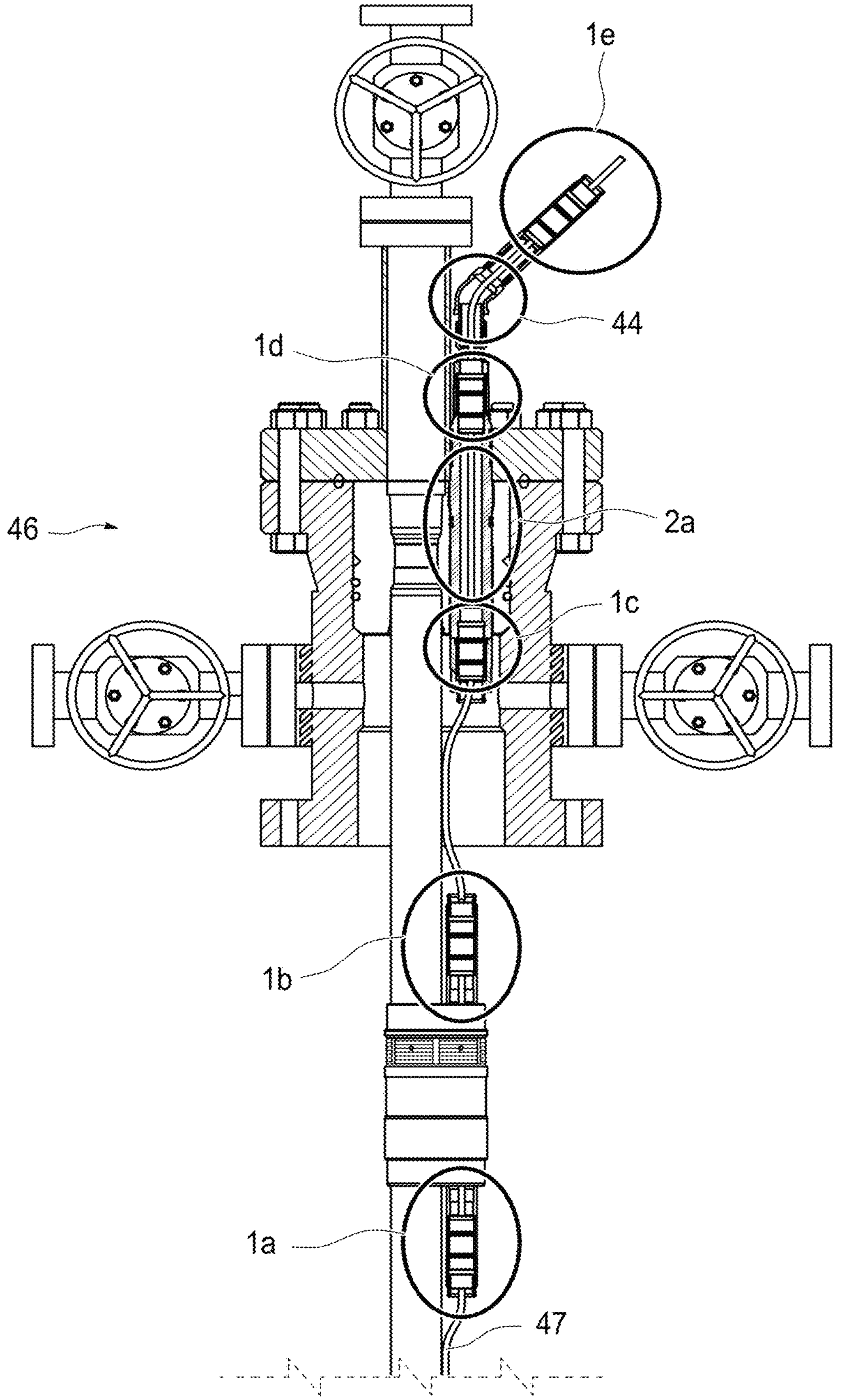
FIG. 11 shows a sectional view corresponding to the application of the present invention in an oil well for an artificial lift system with electrical-submersible pumping (ESP).

In this regard, in FIG. 11, the use of multiple sealing assembly units Ia, Ib, Ic, Id, Ie, some of which are contiguous and others are separated in an oil well for an artificial lift system with electrical-submersible pumping (ESP) is to be noted.

Evidently, the number of units shall vary according to the practical case as well as the configuration and combination of separated and combined configurations.

Other practical applications may arise from the need of isolating two atmospheres and it is required to pass cables or tubes through seal units 1, use multiple sealing units 100 in technically complex sections or perform absolute and total sealings, that is to say the use of plug seals, lower retainer, and upper retainer, with solid bodies, that is to say without through-holes, as shown in FIG. 12.

Likewise and in relation to the same inventive unit, a method is disclosed for carrying out the seal assembly according to the present invention. Said method consists in:

a) Providing a receiver bushing with sealing O-rings on its outer surface in relation to the base element on which the seal assembly shall be attached.

b) Inserting a lower retainer into the receiver bushing ensuring that it is positioned on the corresponding seat.

c) Providing a previously lubricated plug seal, which is fixed to the line of at least one cable or at least a tubing according to the case, sliding it by means of at least the arranged cable or tubing until it is positioned within an adapter provided for said purpose and then positioned on the lower retainer, the plug seal shall have as many through-holes as cables or tubes are required to pass through it.

d) Ensuring that the lower retainer has as many holes as the number of holes of the plug seal.

e) Lubricating and having a sliding jacket and positioning it with an internal coupling in relation to the receiver bushing in such a way that it houses in its interior the plug seal exerting posterior compression on it.

f) Having a pusher on the sliding jacket ensuring that both fit in.

g) Having a closing cap to be joined by means of a threaded coupling to the receiver bushing and ensuring that it exerts longitudinal pressure on the pusher.

h) Tightening by threading up to a stop provided for said purpose.

j) Unscrewing the closing cap and removing the pusher.

k) Having an upper retainer to be positioned at the location that had been occupied by the pusher before, said upper retainer having as many through-holes as the number of holes of the plug seal and the lower retainer.

l) Inserting again the closing cap up to a stop provided for such purpose.

The above-described method is applicable in the same way to the case in which the passage of pass-through cables or tubes is not provided for so as to achieve an absolute and total sealing, wherein the process is as follows:

A method for assembling an isolating seal that makes it possible to isolate two atmospheres with absolute and total isolation, which comprises:

a) Providing a receiver bushing with sealing O-rings on its outer surface in relation to the base element on which the seal assembly is to be attached.

b) Inserting a lower retainer consisting in a solid disc body into the receiver bushing ensuring that it is positioned on the corresponding seat.

c) Providing a previously lubricated solid body plug seal until it is positioned on a lower retainer provided for said purpose.

d) Lubricating and having a sliding jacket and positioning it with an inner coupling in relation to the receiver bushing so that it houses in its interior the plug seal to exert posterior compression on it.

e) Having a pusher on the sliding jacket ensuring that the pusher fits in the edge free surface of the sliding jacket.

f) Having a closing cap to be joined by threading to the receiver bushing and ensuring that it exerts longitudinal pressure on the pusher and the pusher exerts pressure onto the sliding jacket.

g) Tightening by threading up to a stop provided for said purpose.

h) Unscrewing the closing cap and removing the pusher.

i) Having an upper retainer consisting in a solid disc body to be positioned at the location that had been occupied by the pusher.

j) Inserting again the closing cap up to a stop provided for said purpose.

It should be clear and evident that multiple variants may and must be considered from the described inventive concept of the isolating seal assembly 1, multiple sealing units 100, and method to be carried out as well without implying that they are distinctive embodiments, as a consequence of which they are to be deemed as extensions of what is herein described and should be protected under the same sought right.

What is claimed is:

1. An isolating seal assembly for hermetically isolating two areas having different atmospheres, wherein the isolation is total or partial in order to allow for the passage of energy cables or tubes, the isolating seal assembly comprising:

a plug seal having at least one through-hole configured to be traversed by a cable, or a tube;

a lower retainer and an upper retainer, wherein each of said lower retainer and said upper retainer includes a number of through-holes equal to the number of through-holes of the plug seal;

a receiver bushing configured to receive the lower retainer, the plug seal, and the upper retainer, wherein the plug seal is configured to be disposed between the lower retainer and the upper retainer;

a closing cap configured to engage and close a section of the receiver bushing;

sealing O-rings disposed on an outer surface of a sliding jacket and on an outer surface of the receiver bushing; and a pusher configured to be temporarily part of the isolating seal assembly during a compression phase of said isolating seal assembly, wherein said sliding jacket has a free portion configured to be engaged by the pusher during said compression phase so that:

the lower retainer is positioned within the receiver bushing;

the plug seal is introduced into the receiver bushing over said lower retainer;

the sliding jacket is positioned over the plug seal;

the pusher is positioned over the sliding jacket;

the closing cap engages the section of the receiver bushing, and pushes the pusher, which in turn, presses the sliding jacket towards the plug seal until achieving total closure of the closing cap with the receiver bushing;

the closing cap is disengaged to remove said pusher so that the upper retainer is inserted to replace said pusher; and the closing cap engages and closes said receiver bushing again.

2. The isolating seal assembly of claim 1, wherein closure between the closing cap and the receiver bushing is by threading.

3. The isolating seal assembly of claim 1, wherein closure between the closing cap and the receiver bushing is by press fit, and then by lateral securing mechanisms that prevent movement with respect to each other.

4. The isolating seal assembly of claim 1, wherein the plug seal is made of a resilient material.

5. The isolating seal assembly of claim 1, wherein the receiver bushing allows assembly both in a downward direction and an upward direction, in such a way that the receiver bushing is dual.

6. The isolating seal assembly of claim 1, wherein the receiver bushing allows assembly in one direction, while in another direction connects to a first connector coupling.

7. The isolating seal assembly of claim 6, wherein said first connector coupling couples with a connector at a free end thereof.

8. The isolating seal assembly of claim 7, wherein said connector is straight.

9. The isolating seal assembly according to claim 7, wherein said connector is an angled elbow.

10. The isolating seal assembly of claim 6, wherein said connector couples with a second connector coupling.

11. The isolating seal assembly of claim 10, wherein said second connector coupling is coupled with a free end of a closing cap corresponding to at least one isolating seal assembly unit.

12. The isolating seal assembly according to claim 10, wherein said second connector coupling is coupled to a free end of a closing cap which is a terminal end of a plurality of contiguously arranged seal assemblies.

13. The isolating seal assembly of claim 1, wherein the plug seal is made of an elastomeric material.

14. The isolating seal assembly of claim 13, wherein said elastomeric material is rubber.

15. The isolating seal assembly of claim 1, wherein the receiver bushing is made of a metallic material.

16. The isolating seal assembly of claim 1, wherein the lower retainer is made of a metallic material.

17. The isolating seal assembly of claim 1, wherein the sliding jacket is made of a metallic material.

18. The isolating seal assembly of claim 1, wherein the pusher is made of a polymeric material.

19. The isolating seal assembly of claim 1, wherein the upper retainer is made of a polymeric material.

20. The isolating seal assembly of claim 1, wherein the closing cap is made of a metallic material.

21. A method for assembling the isolating seal assembly of claim 1, comprising the steps of:

a) providing the receiver bushing with sealing O-rings on an outer surface thereof for attachment to a base element;

b) inserting the lower retainer into the receiver bushing, ensuring that said lower retainer is positioned on a seat provided in the receiver bushing;

c) providing a plug seal, which is fixed to at least one of a cable or a tubing, and sliding the plug seal via said at least one of a cable or a tubing until said plug seal is positioned within an adapter and on top of said lower retainer, wherein said plug seal and said lower retainer have an equal number of through-holes;

d) positioning the sliding jacket within the receiver bushing in such a way that said sliding jacket houses the plug seal within for subsequent compression thereof;

e) positioning said pusher on the sliding jacket, ensuring that the pusher and the sliding jacket fit together;

f) coupling the closing cap to the receiver bushing so that said closing cap exerts longitudinal pressure on said pusher until reaching à detent;

g) uncoupling the closing cap from the receiver bushing, and removing the pusher;

h) positioning the upper retainer at a location that had been occupied by the pusher, wherein said upper retainer has as many through-holes as said plug seal and said lower retainer; and i) recoupling the closing cap to the receiver bushing until reaching said detent.

22. An isolating seal assembly for hermetically isolating two areas having different atmospheres, the isolating seal assembly comprising:

a plug seal without through-holes;

a lower retainer and an upper retainer without through-holes;

a receiver bushing configured to receive the lower retainer, the plug seal, and the upper retainer, wherein the plug seal is configured to be disposed between the lower retainer and the upper retainer;

a closing cap configured to engage and close a section of the receiver bushing;

sealing O-rings disposed on an outer surface of a sliding jacket and on an outer surface of the receiver bushing; and a pusher configured to be temporarily part of the isolating seal assembly during a compression phase of said isolating seal assembly, wherein said sliding jacket has a free portion configured to be engaged by the pusher during said compression phase so that:

the lower retainer is positioned within the receiver bushing;

the plug seal is introduced into the receiver bushing over said lower retainer;

the sliding jacket is positioned over the plug seal;

the pusher is positioned over the sliding jacket;

the closing cap engages the section of the receiver bushing, and pushes the pusher, which in turn, presses the sliding jacket towards the plug seal until achieving total closure of the closing cap with the receiver bushing;

the closing cap is disengaged to remove said pusher so that the upper retainer is inserted to replace said pusher; and the closing cap engages and closes said receiver bushing again.

23. A method for assembling the isolating seal assembly of claim 22, comprising the steps of:

a) providing a receiver bushing with sealing O-rings on an outer surface thereof for attachment to a base element;

b) inserting the lower retainer consisting of a solid body into the receiver bushing ensuring that said lower retainer is positioned on a seat provided in the receiver bushing;

c) providing the plug seal on top of said lower retainer;

d) positioning the sliding jacket within the receiver bushing in such a way that said sliding jacket houses the plug seal within for subsequent compression thereof;

e) positioning said pusher on the sliding jacket, ensuring that the pusher and the sliding jacket fit together;

f) coupling the closing cap to the receiver bushing so that said closing cap exerts longitudinal pressure on said pusher until reaching a detent;

g) uncoupling the closing cap from the receiver bushing, and removing the pusher;

h) positioning the upper retainer at a location that had been occupied by the pusher; and i) recoupling the closing cap to the receiver bushing until reaching said detent.

* * * * *